United States Patent [19]

Lovett

[11] Patent Number: 5,405,068

[45] Date of Patent: Apr. 11, 1995

[54] MOTORCYCLE BAG

[76] Inventor: Terry Lovett, 3712 C Santa Fe Village Dr., Santa Ana, Calif. 92704

[21] Appl. No.: 191,287

[22] Filed: Feb. 3, 1994

Related U.S. Application Data

[63] Continuation-in-part of Ser. No. 898,896, Jun. 15, 1992, Pat. No. Des. 348,041.

[51] Int. Cl.6 .................................................. A45F 4/02
[52] U.S. Cl. ..................................... 224/153; 224/275; 224/42.420
[58] Field of Search ................ 280/288.4, 304.5, 202; 224/153, 275, 31, 32 R, 42.01, 42.42, 42.46 R, 209, 213, 214, 42.11, 151, 273, 155, 250, 251, 202, 210, 211, 212, 215, 216, 30 A, 30 R, 32 A, 42.32, 42.34, 42.37; 190/1, 100, 102, 107

[56] References Cited

U.S. PATENT DOCUMENTS

| | | | |
|---|---|---|---|
| D. 219,761 | 1/1971 | Akers et al. | |
| D. 249,036 | 8/1978 | Ramalia | D12/158 |
| D. 253,269 | 10/1979 | Ramalia | |
| D. 308,916 | 7/1990 | Dinham | D3/40 |
| 3,791,563 | 2/1974 | Raat | |
| 3,813,018 | 5/1974 | Heltzen | |
| 3,989,080 | 11/1976 | Koszegi | 150/1.7 |
| 4,003,508 | 1/1977 | Hoops | 224/32 R |
| 4,059,207 | 11/1977 | Jachson et al. | |
| 4,125,213 | 11/1978 | Watkins | |
| 4,491,258 | 1/1985 | Jones | |
| 4,911,271 | 3/1990 | Stanley | 190/102 |

OTHER PUBLICATIONS

Cycle advertisement, p. 31, Jul. 1976.

Primary Examiner—Renee S. Luebke
Assistant Examiner—David J. Walczak
Attorney, Agent, or Firm—Price, Gess & Ubell

[57] ABSTRACT

An improved bag for use on a motorcycle that is equipped with a padded seat back. The bag is readily attached to and detached from the cycle by inserting the motorcycle seat back into a snugly-fitting pocket on the front-facing surface of the bag. The attachment of the bag to the cycle is additionally stabilized by straps attached to the bag that engage members of the seat back or members of a rear luggage rack. The bag is provided with gussets to expand its storage capacity as well as a strap and fabric structure to secure a bed roll to the top of the bag. Straps may be attached so that the bag can be carried as either a shoulder bag or a backpack. In addition, a second bag may be attached to the front-facing surface of the bag such that the second bag rests on the passenger portion of the motorcycle seat.

29 Claims, 6 Drawing Sheets

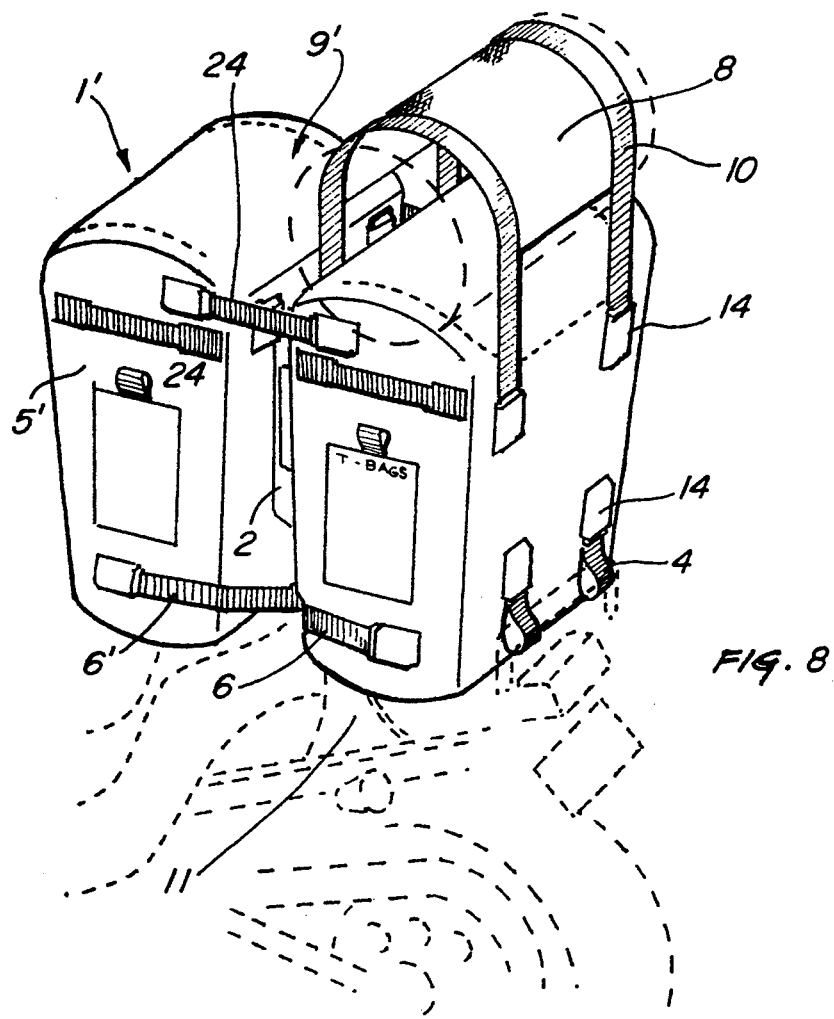
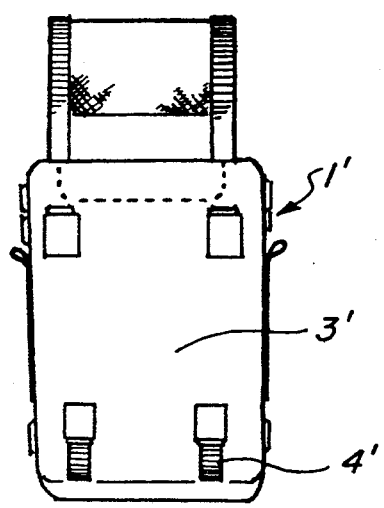
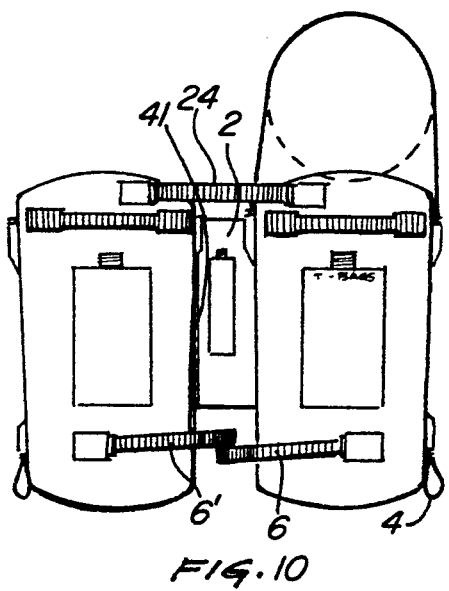
FIG. 8
FIG. 9
FIG. 10

MOTORCYCLE BAG

This is a continuation-in-part of application Ser. No. 07/898,896, filed Jun. 15, 1992 and issued Jun. 21, 1994, as Des. 348,041.

BACKGROUND OF THE INVENTION

1. Field of the Invention

This invention relates to a luggage container for use with motorcycles and, more specifically, to a bag that can be removably attached to a motorcycle by means of a pocket, attached to one surface of the bag, which fits snugly over the rear seat of the cycle.

2. Description of Related Art

A number of different bag designs have been developed to cope with the problems of attaching luggage to a motorcycle. An ideal luggage bag for a motorcycle would be capable of carrying a large and variable volume of items and would be easy to attach securely to and easy to remove from the motorcycle. In the past many motorcycles and bicycles used bags arranged as panniers which hung down on either side of the rear wheel, such as is shown in U.S. Pat. No. 4,491,258 to Jones. Such an arrangement provides for a large storage volume. However, such a design has proven more successful with bicycles than with motorcycles. This may be because the rear wheel of a motorcycle is much thicker than that of a bicycle, and because a motorcycle attains much higher speeds than a bicycle. These factors make it difficult to adequately secure motorcycle panniers against machine motion and buffering by wind. Consequently, the preferred designs for motorcycles have involved bags that are supported by motorcycle seat members or by special added structures. For example, U.S. Pat. No. 3,791,563 to Raat discloses a rack structure that can be attached behind the seat of a cycle. This rack can then be used to attach a variety of motorcycle bags.

When bags are attached to the seat or other parts of the motorcycle, it is difficult to ensure secure attachment of the bags and yet still be able to easily remove them later. Today many motorcycles have a vertically oriented seat back or, alternatively, a vertical tubular frame (sissy bar) behind the main seat. These structures may separate the seat from a rear luggage rack and may also serve as a seat back for a passenger seated behind the motorcyclist.

A number of bag designs have used the sissy bar, the passenger seat back, or the luggage rack to the rear of the seat area as points of attachment for a bag. U.S. Pat. No. 4,003,508 to Hoops discloses the use of a sleeve and straps on the front surface of a bag to attach the bag to the sissy bar. However, such a structure may not adequately grip the sissy bar, and thus allow the bag to pivot or "windmill" around the sissy bar. U.S. Pat. No. Des. 249,036 to Ramalia et al. and U.S. Pat. No. Des. 253,269 to Ramalia attempt to rectify this problem by providing eyelets and lace to make the sleeve fit the sissy bar more tightly.

U.S. Pat. No. 3,813,018 to Heltzen teaches a collapsible luggage pouch that is attached to the back of the passenger seat back and rests on the luggage rack. Such a bag can contain only a limited volume of luggage and may not be attached with sufficient security. U.S. Pat. No. Des. 308,916 shows a bag that is attached to the cycle by a superficial pouch that fits over the seat back. Again, this type of bag may suffer from inadequately secure attachment to the motorcycle. An inadequately secured bag may flap, vibrate, or even come loose when the cycle is traveling at high speeds. U.S. Pat. No. 4,125,213 to Watkins teaches a large, collapsible luggage bag that is strapped to the passenger seat and clamped, at its bottom, to bars of the luggage rack.

OBJECTS AND SUMMARY OF THE INVENTION

It is an object of the present invention to provide a travel bag for a motorcycle that can be easily attached and removed from the cycle;

It is a further object of the present invention to ensure that the attachment of the bag to the cycle is secure and will not "windmill" or vibrate during cycle operation; and It is an additional object of the present invention to provide a travel bag with a large and expandable storage capacity.

These and other related objects have been met by making a bag that bears an external pocket on the surface of the bag that faces the front of the cycle. This pocket is sized to fit snugly over the rear passenger seat back. The pocket is located on the bag so that the bottom of the bag will just rest on the luggage rack when the seat back is completely inserted into the pocket. Although the snug pocket stably attaches the bag, straps are provided to further engage the seat back members or the luggage rack members to ensure that the bag will not come loose during use.

Additional storage capacity is provided by attaching a second storage bag to the first or by opening a zippered gusset that allows the travel bag to expand. Extra capacity cannot be provided by simply making the bag oversize, since a loosely-filled bag will vibrate and flap when the cycle is in motion.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 8 is a perspective view of an alternative embodiment of the motorcycle bag wherein two similar bags are joined together;

FIG. 9 is a front elevational view of the two joined motorcycle bags;

FIG. 10 is a left side elevational view of the two joined motorcycle bags;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a motorcycle bag that can be easily removably attached to a motorcycle by means of an external pocket on the bag that fits snugly over the rear seat back of the cycle.

Figure 1:
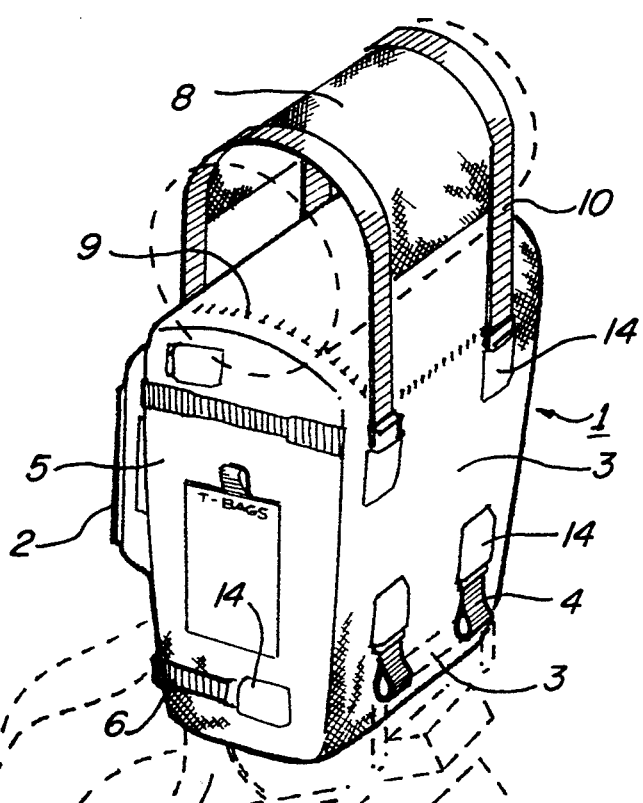
FIG. 1 is a perspective view of a motorcycle bag mounted on the rear of a cycle (dashed lines) and showing the mechanism for retaining a bed roll (dashed lines)

FIG. 1 shows the motorcycle bag 1 in place on the rear luggage rack of a motorcycle (dotted lines) behind the cycle's seat 12. The bag 1 is a more or less rectangular prism with a rear surface 3, a top surface 9, and a side surface 5 being shown in the figure. The bag 1 is constructed from a durable, water-resistant fabric. A heavyweight nylon fabric with considerable dimensional stability, such as "CORDURA," is ideal for this purpose.

Figure 2:
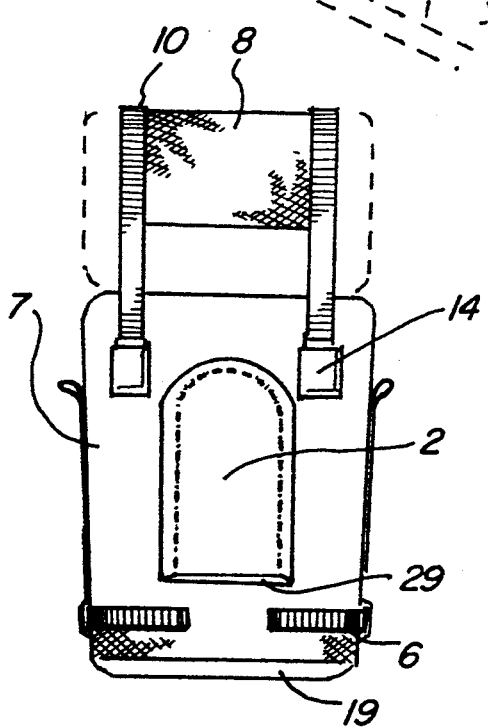
FIG. 2 is a front plan elevational view of the motorcycle bag.
Figure 16:
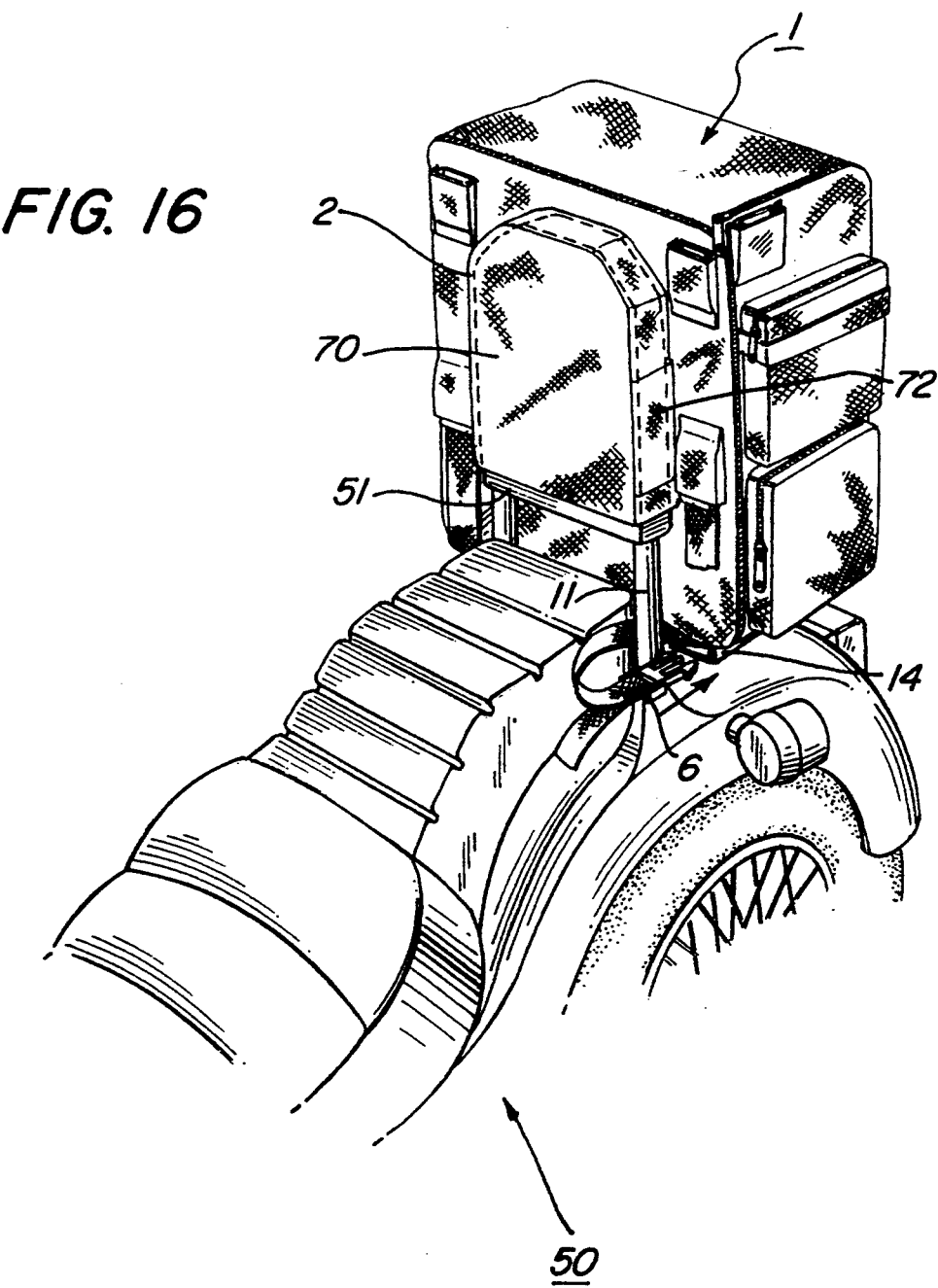
FIG. 16 is a perspective view of the motorcycle bag and a motorcycle showing how the bag is mounted to the cycle.

FIG. 2 shows the front surface 7 of the bag 1. An external pocket 2 is attached to the front surface 7. The opening 29 of the pocket 2 faces the bottom surface 19 of the bag 1. The pocket 2 is substantially rectangular in shape and, as shown in FIG. 16, is preferably comprised of a front panel 70 and a side strip 72 that connects the front panel 70 to the bag 1. The pocket 2 is sized and shaped to fit snugly over the padded rear seat back 51 of the motorcycle 50.

Applicant has discovered that careful construction of a snugly-fitting pocket 2 is central to the successful operation of the present invention. A properly fitting pocket 2 securely attaches the bag 1 and is constructed so that the internal volume of the pocket 2 is less than the volume of the padded seat back 51. The attachment is secure because the pocket partially compresses the resilient padding material of the seat back 51. That is, because the volume of the pocket is less than that of the seat back 51, the seat back padding is compressed both in directions perpendicular and parallel to the long axis of the seat back so that the seat back 51 can fit within the pocket 2. The padding is elastic and exerts force against the inner surfaces of the pocket 2. This force ensures a tight union between the pocket and the seat back 51. The pocket 2 is essentially press-fit to the seat back 51. Therefore, it is important for the pocket 2 to be constructed of a durable material that does not stretch appreciably. Because the rear seat back 51 varies in dimensions from model to model of motorcycle, it is necessary to specifically size the pocket 2 and the rest of the bag 1 for each particular model of cycle.

The bag's 1 primary attachment to the cycle is effected by the pocket 2 fitting snugly over the rear seat back 51, but it is important to construct the pocket so that the bottom surface 19 of the bag 1 just rests on the luggage rack or a member of the rear fender when the seat back 51 is fully inserted into the pocket 2. That is to say, while the pocket 2 attaches the bag 1 to the motorcycle, the weight of the bag is borne by the luggage rack or the fender. Otherwise, there might be excessive stress on the pocket 2. In addition, having the weight rest on the luggage rack makes it less likely that the traveling motion of the moving motorcycle will cause the bag 1 to shift position.

The Applicant has found it desirable to provide additional means of attachment to further stabilize the bag 1 and to ensure against any failure of the pocket 2. This is accomplished by running additional straps from the bag 1 to some member of the motorcycle. So the bag can be quickly attached and detached from the cycle, the straps are attached to the bag 1 by quick disconnect clamps 14 (preferably concealed in decorative pockets as shown). The availability and position of motorcycle members for strap attachment varies from model to model of motorcycle.

Convenient points of attachment are provided by support struts 11 of the rear seat back and by members 3 of the rear of the luggage rack. As shown in FIG. 1, the bag 1 may be equipped with first straps 6 to engage the struts 11 of the seat back. The first straps 6 loop around seat struts 11 (dotted lines) of the seat back. The bag 1 may also have second straps 4 to engage the rear members 3 of the luggage rack. The strap arrangement, like the pocket 2, should be customized for an individual cycle design. That is, the straps provided on a particular model of the bag 1 are selected to fit the configuration of the motorcycle for which the bag 1 is intended. Currently, the favored configuration uses strap 6 to engage struts 11 of the rear seat back 51 as shown in FIGS. 1, 6, 7, 10, 13, 14 and 16.

A properly-fitting snug pocket 2 does not detract from the functioning of the rear seat back: it does not affect a passenger's use of the seat. An additional advantage of the present invention is that if the rear seat is not occupied by a passenger, it is possible to mount the bag 1 in a reversed orientation so that the front surface 7 faces the rear of the cycle. The pocket 2 still fits snugly over the rear seat back 51, but the bottom surface 19 of the bag 1 rests on the passenger area of the motorcycle seat 12. This allows the rider to use the bag as a back rest.

If a passenger is not present, the bag system of the present invention can also supply additional storage capacity as well as the back rest as explained above. In this case, as shown in FIG. 8, rather than reversing the position of the motorcycle bag 1, a second bag 1' is attached to the first bag 1. The second bag 1' is substantially similar to the first bag 1 in construction and dimensions. However, the second bag 1' does not have a snug fitting pocket 2. Rather the two bags 1 and 1' are joined by means of straps 24, which run from the upper area of side surface 5 of bag 1 to the upper area of side surface 5' of bag 1' (See FIGS. 8, 10, and 14). Similarly, straps 4' of the second bag 1' are analogous to the straps 4 of the first bag 1, while a rear facing surface 3' of the bag 1' is analogous to the rear facing surface 3 of the bag 1, an upper surface 9' of the second bag 1' is analogous to the upper surface 9, and a bottom surface 19' is analogous to the bottom surface 19. In addition, the second bag 1' also has straps 6' which are analogous to straps 6 on bag 1. Straps 6' loop around the seat back strut 11 and stabilize the attachment of bag 1'

When second bag 1' is attached to bag 1, the snugly-fitting pocket 2 on bag 1 is sandwiched between the two bags 1 and 1'. To further ensure the stability of the union between bags 1 and 1', the rear-facing surface of bag 1' bears a zipper fastening system 41 that mates with a complementary fastening system 41 on the front-facing surface of the pocket 2 of bag 1. In the preferred embodiment the fastening system 41 comprises a zipper. Other fasteners such as snaps or a hook-in-loop material can also be used for this purpose.

Figure 15:
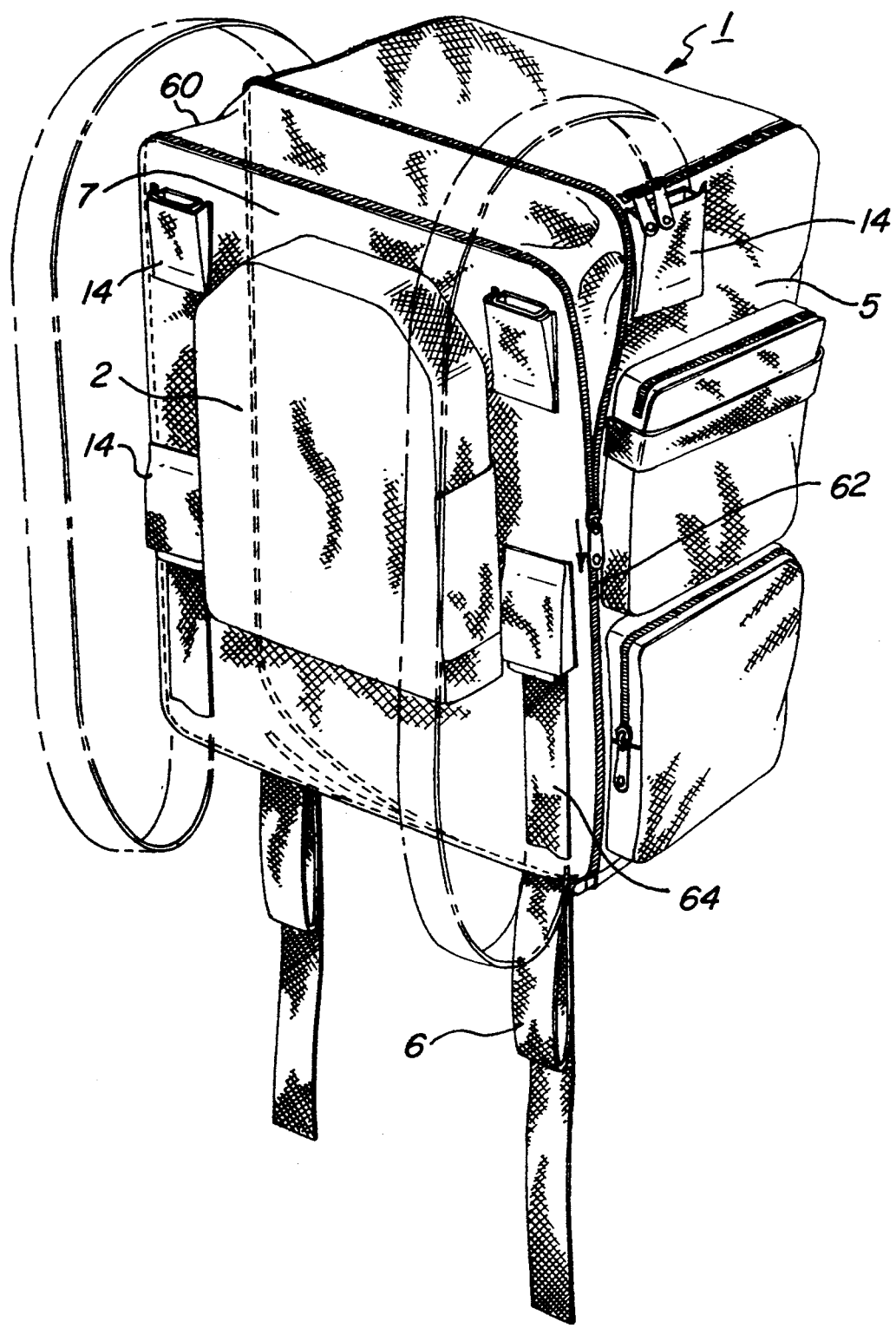
FIG. 15 is front elevational view of an alternative embodiment of the motorcycle bag wherein a zippered gusset provides for expansion of the bag.

Motorcycle bag 1 can also provide additional storage volume without the necessity of adding a second bag 1'. As is shown in FIG. 15, bag 1 is provided with a gusset 60 which extends around one edge of the bag 1. In the preferred embodiment the gusset 60 extends entirely around the edge of the front-facing surface 7 of the bag 1. Of course, other edges could be chosen or there could be two gussets 60 on a single bag 1. The gusset 60 provides extra volume to the bag 1. When the extra storage space is not needed, the gusset 60 is closed by a zipper 62 so that the bag 1 remains taut to resist wind-caused flapping.

Figure 3:
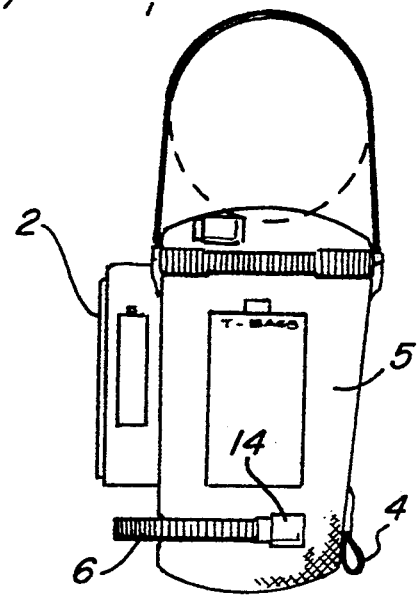
FIG. 3 is a left side elevational view of the motorcycle bag.
Figure 4:
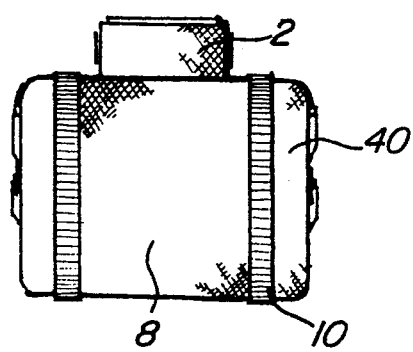
FIG. 4 is a top plan view of the motorcycle bag.
Figure 5:
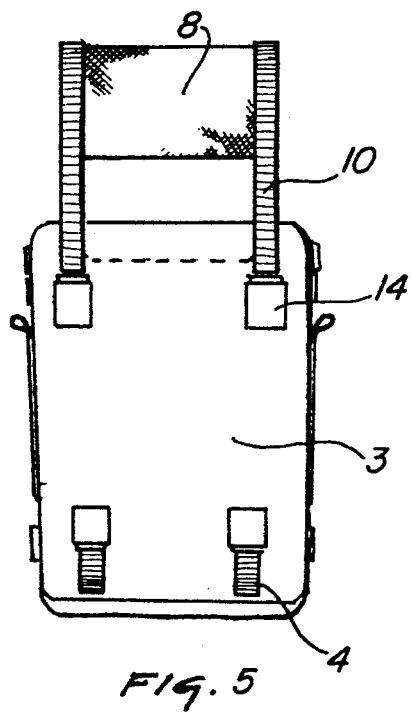
FIG. 5 is a rear elevational view of the motorcycle bag.
Figure 7:
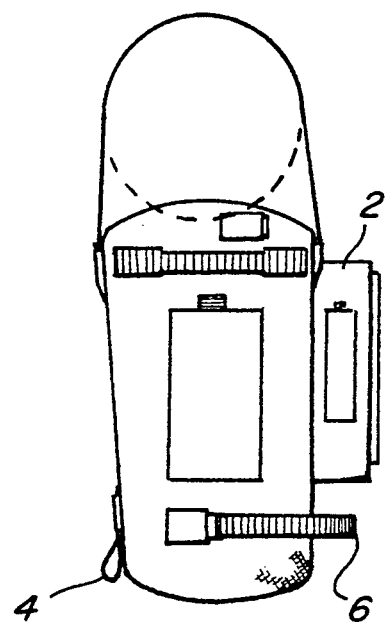
FIG. 7 is a right side elevational view of the motorcycle bag.
Figure 6:
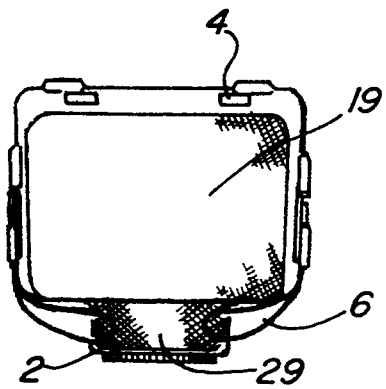
FIG. 6 is a bottom plan view of the motorcycle bag.
Figure 11:
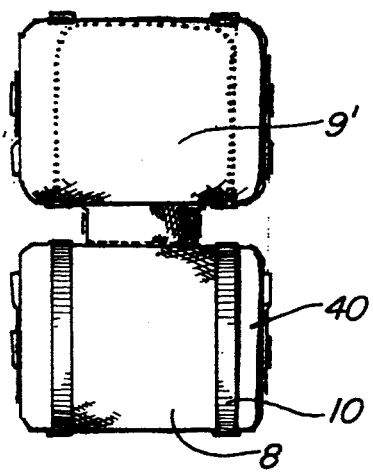
FIG. 11 is a top plan view of the two joined motorcycle bags.
Figure 12:
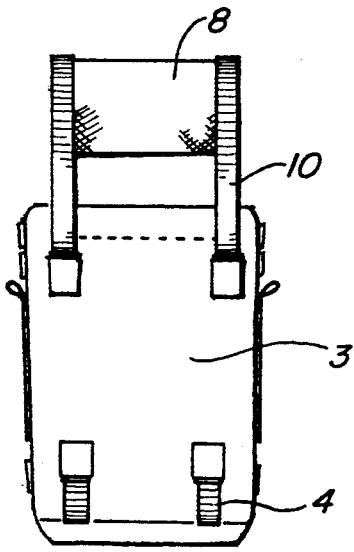
FIG. 12 is a rear elevational view of the two joined motorcycle bags.
Figure 14:
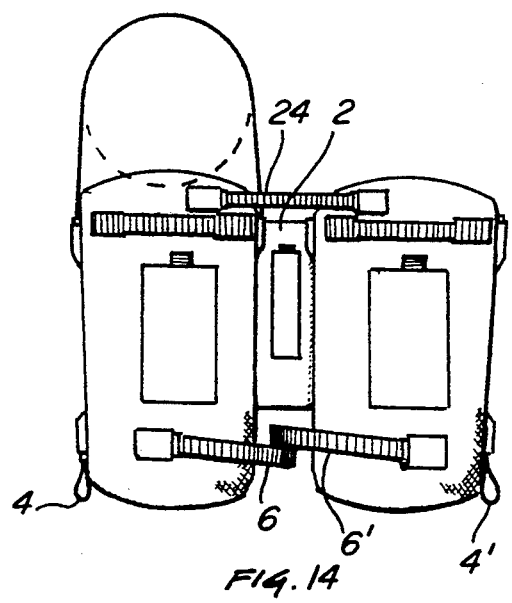
FIG. 14 is a right side elevational view of the two joined motorcycle bags.
Figure 13:
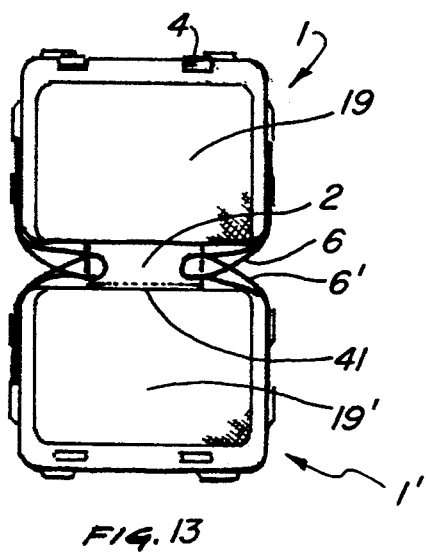
FIG. 13 is a bottom plan view of the two joined motorcycle bags.

An additional feature of the motorcycle bag 1 is a provision for the attachment of a bed roll 40 to the upper surface 9. For this purpose a fabric web 8 is sewn between a pair of straps 10. Quick disconnects 14 are provided at each of the upper corners of bag 1. As shown in FIGS. 1, 2, and 3 when the straps are inserted into the quick disconnects 14, the resulting structure surrounds and secures the bed roll 40.

As shown in FIG. 15, additional straps may be provided to facilitate carrying the bag 1 when it is not attached to the motorcycle 50. Strap 64 is intended to engage with quick disconnect 14 on the upper edge of side surface 5. A single strap 64 so engaged can be used as a shoulder strap to carry the bag 1. Alternatively, other strap configurations may be used to provide a convenient shoulder strap. When two straps 64 are correctly engaged, the bag 1 becomes a convenient backpack (as shown in dotted lines).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved bag for use on a motorcycle, the motorcycle having a compressible, padded seat back, the bag comprising:
   a bag body for containing clothing or other gear; and
   a nonelastic pocket, with a single opening and an indivisible front face for sitting against, attached to a front-facing surface of the bag body and extending outward therefrom, the opening of the pocket facing towards a bottom surface of the bag body, the pocket sized to snugly fit over and compress the padded seat back of the motorcycle.

2. The bag of claim 1, wherein the pocket is positioned on the bag body such that the bottom surface of the bag body rests on a member of the motorcycle when the seat back is fully inserted into the pocket.

3. The bag of claim 1 further comprising additional attachment means for further detachably securing the bag to the motorcycle to ensure stability of the attachment and to prevent oscillations of the bag during movement of the motorcycle.

4. An improved bag for use on a motorcycle, the motorcycle having a compressible, padded seat back, the bag comprising:
   a bottom surface;
   a top surface;
   a rear-facing surface;
   a front-facing surface;
   two side-facing surfaces;
   an external pocket with a single opening and an indivisible front face for sitting against, the pocket attached to the front-facing surface of the bag and extending outward therefrom, the opening of the pocket facing towards the bottom surface of the bag, the pocket sized to snugly fit over and compress the padded seat back with the pocket positioned on the bag so that the bottom surface of the bag rests on a member of the motorcycle when the seat back is fully inserted into the pocket; and
   additional attachment means for detachably securing the bag to the motorcycle to ensure stability of the attachment, the attachment means comprising at least one pair of straps.

5. The bag of claim 4, wherein the additional attachment means comprises a pair of straps attached to the bag and engaging a rear member of the motorcycle frame.

6. The bag of claim 4, wherein the additional attachment means comprises a pair of straps attached to the bag and engaging a member of the seat back of the motorcycle.

7. The bag of claim 4, further comprising:
   a pair of straps connected by a web of fabric for capturing a bed roll;
   first securing means for detachably securing ends of the straps near an upper edge of the front-facing surface of the bag; and
   second securing means for detachably securing ends of the straps near an upper edge of the rear-facing surface of the bag,
   so that a bed roll, captured by the fabric web, may be removably attached to the bag and held in tight contact with the top surface of the bag.

8. The bag of claim 4, further comprising:
   a second bag of dimensions and shape similar to the first bag;
   attachment means for removably attaching the second bag to the first bag; and
   a pair of straps attached to the second bag and engaging a member of the seat back of the motorcycle, to stabilize the attachment of the second bag.

9. The bag of claim 8, wherein the attachment means for removably attaching the second bag comprise:
   a pair of straps;
   a device for removably attaching the straps to side-surfaces of each bag; and
   securing means for removably attaching a rear-facing surface of the second bag to a front-facing surface of the pocket of the first bag.

10. The bag of claim 9, wherein the securing means for attaching the rear-facing surface of the second bag to the front-facing surface of the pocket of the first bag comprises a zipper-type fastener.

11. The bag of claim 4, further comprising a gusset which extends around an edge of a surface of the bag and is opened and closed by a zipper, the gusset providing for expansion of the bag.

12. The bag of claim 4, further comprising a shoulder strap and means for detachably securing the strap to the bag so that the bag can be conveniently carried by the shoulder strap when the bag is not attached to the motorcycle.

13. The bag of claim 4, further comprising straps and means for detachably securing the straps to the bag such that the bag can be conveniently carried by the straps as a backpack when the bag is not attached to the motorcycle.

14. An improved bag for use on a motorcycle, the motorcycle having a compressible, padded seat back, the bag comprising:
 a bag body for containing clothing or other gear;
 an external pocket, with a single opening and an indivisible front face for sitting against, attached to a front-facing surface of the bag body and extending outward therefrom, the opening of the pocket facing towards a bottom surface of the bag body, the pocket sized to snugly fit over and compress the padded seat back with the pocket positioned on the bag body so that the bottom surface of the bag body rests on a member of the motorcycle when the seat back is fully inserted into the pocket; and
 additional attachment means for further detachably securing the bag to the motorcycle to ensure stability of the attachment and to prevent oscillations of the bag during movement of the motorcycle.

15. The bag of claim 14, wherein the additional attachment means comprises a pair of straps attached to the bag body and engaging a member of the seat back of the motorcycle.

16. The bag of claim 14 further comprising:
 a pair of straps connected by a web of fabric for capturing a bed roll;
 securing means for detachably securing ends of the straps near an upper edge of the front-facing surface of the bag body; and
 securing means for detachably securing ends of the straps near an upper edge of a rear-facing surface of the bag body,
so that a bed roll, captured by the fabric web, may be removably attached to the bag and held in tight contact with a top surface of the bag body.

17. The bag of claim 14, further comprising a gusset which extends around an edge of a surface of the bag and is opened and closed by a zipper, the gusset providing for expansion of the bag.

18. The bag of claim 14, further comprising a shoulder strap and means for detachably securing the strap to the bag body such that the bag can be conveniently carried by the shoulder strap when the bag is not attached to the motorcycle.

19. The bag claim 14, further comprising straps and means for detachably securing the straps to the bag body with the straps disposed so that the bag can be conveniently carried as a backpack when the bag is not attached to the motorcycle.

20. An improved bag system for use on a motorcycle, the motorcycle having a compressible, padded seat back, the bag system comprising:
 a first bag comprising:
  a bottom surface;
  a top surface;
  a rear-facing surface;
  a front-facing surface;
  two side-facing surfaces;
  an external pocket attached to the front facing surface of the bag and extending outward therefrom, an opening of the pocket facing towards the bottom surface of the bag, the pocket sized to snugly fit over and compress the padded seat back of the motorcycle, and the pocket positioned on the bag so that the bottom surface of the bag rests on a member of the motorcycle when the seat back is fully inserted into the pocket; and
  additional attachment means for detachably securing the bag to the motorcycle to ensure stability of the attachment, the attachment means comprising at least one pair of straps; and
 a second bag, similar in shape and dimensions to the first bag and positioned with the padded seat back between the two bags the second bag further comprising:
  attachment means for removably attaching the second bag to the first bag; and
  a pair of straps attached to the second bag and engaging a member of the seat back of the motorcycle, to stabilize the attachment of the second bag.

21. The bag of claim 20, wherein the attachment means for removably attaching the second bag comprise:
 a pair of straps;
 a device for removably attaching the straps to side surfaces of each bag; and
 securing means for removably attaching a rear-facing surface of the second bag to a front-facing surface of the pocket of the first bag.

22. The bag of claim 21, wherein the securing means for attaching the rear-facing surface of the second bag to the front-facing surface of the pocket of the first bag comprises a zipper-type fastener.

23. An improved bag for use on a motorcycle, the motorcycle having a compressible, padded seat back, the bag comprising:
 a bag body for containing clothing or other gear; and
 a nonelastic pocket, formed with an indivisible front face for sitting against, attached to a front-facing surface of the bag body and extending outward therefrom, an opening of the pocket facing towards a bottom surface of the bag body, the pocket having an internal volume less than that of the padded seat back of the motorcycle and sized to snugly fit over and compress the padded seat back of the motorcycle in a direction perpendicular to a long axis of the seat back.

24. The bag of claim 23 further comprising additional attachment means for further detachably securing the bag to the motorcycle to ensure stability of the attachment and to prevent oscillations of the bag during movement of the motorcycle.

25. An improved bag for use on a motorcycle, the motorcycle having a compressible, padded seat back, the bag comprising:
 a bottom surface;
 a top surface;
 a rear-facing surface;
 a front-facing surface;
 two side-facing surfaces;
 an external pocket constructed from nonelastic material with an indivisible front face for sitting against, the pocket attached to the front-facing surface of the bag and extending outward therefrom, the opening of the pocket facing towards the bottom surface of the bag, the pocket having an internal volume less than that of the padded seat back of the motorcycle and sized to snugly fit over and compress the padded seat back of the motorcycle both in a direction perpendicular to a long axis of the seat back with the pocket positioned on the bag so that the bottom surface of the bag rests on a member of the motorcycle when the seat back is fully inserted into the pocket; and additional attachment means for detachably securing the bag to the motorcycle to ensure stability of the attachment, the attachment means comprising at least one pair of straps.

26. The bag of claim 24, further comprising:

a pair of straps connected by a web of fabric for capturing a bed roll;

first securing means for detachably securing ends of the straps near an upper edge of the front-facing surface of the bag; and second securing means for detachably securing ends of the straps near an upper edge of the rear-facing surface of the bag, so that a bed roll, captured by the fabric web, may be removably attached to the bag and held in tight contact with the top surface of the bag.

27. The bag of claim 25, further comprising a shoulder strap and means for detachably securing the strap to the bag so that the bag can be conveniently carried by the shoulder strap when the bag is not attached to the motorcycle.

28. The bag of claim 25, further comprising a gusset which extends around an edge of a surface of the bag and is opened and closed by a zipper, the gusset providing for expansion of the bag.

29. The bag of claim 25, further comprising a straps and means for detachably securing the straps to the bag such that the bag can be conveniently carried by the straps as a backpack when the bag is not attached to the motorcycle.

* * * * *